(12) United States Patent
Freitas et al.

(10) Patent No.: US 11,610,089 B2
(45) Date of Patent: *Mar. 21, 2023

(54) APPARATUS

(71) Applicant: FREEVOLT TECHNOLOGIES LIMITED, London (GB)

(72) Inventors: Vitor Andrade Freitas, London (GB); Manuel Pinuela Rangel, London (GB); Victor Diaz, London (GB)

(73) Assignee: FREEVOLT TECHNOLOGIES LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,043

(22) Filed: Mar. 3, 2022

(65) Prior Publication Data

US 2022/0188587 A1 Jun. 16, 2022

Related U.S. Application Data

(63) Continuation of application No. 16/759,543, filed as application No. PCT/GB2018/053125 on Oct. 29, 2018, now Pat. No. 11,295,187.

(30) Foreign Application Priority Data

Oct. 27, 2017 (GB) ..................... 1717741

(51) Int. Cl.
*G06K 19/07* (2006.01)
*H02J 50/10* (2016.01)
(Continued)

(52) U.S. Cl.
CPC ..... *G06K 19/0709* (2013.01); *G06K 19/0718* (2013.01); *G06K 19/0723* (2013.01);
(Continued)

(58) Field of Classification Search
CPC .......... G06K 19/0709; G06K 19/0718; G06K 19/0723; H02J 50/10; H02J 50/20;
(Continued)

(56) References Cited

U.S. PATENT DOCUMENTS 6,134,130 A 10/2000 Connell et al.
8,922,347 B1 12/2014 De Rochemont
(Continued)

FOREIGN PATENT DOCUMENTS

EP 3276845 1/2018
EP 3279836 2/2018
(Continued)

OTHER PUBLICATIONS

Search Report issued in Appl. No. GB1717741.1 (dated 2018).
Search Report & Written Opinion issued in Appl. No. PCT/GB2018/053125 (dated 2019).

*Primary Examiner* — Curtis B Odom
(74) *Attorney, Agent, or Firm* — Barnes & Thornburg LLP

(57) ABSTRACT

An apparatus comprising: an inductive coupler for coupling inductively with a radio frequency, RF, H-field to provide an alternating RF voltage; a near field, RF, communicator connected to the inductive coupler for performing near field RF communication; an auxiliary circuit connected to the inductive coupler by a rectifier for obtaining DC electrical energy from the alternating RF voltage wherein the auxiliary circuit is arranged to communicate data with the near field RF communicator; wherein the rectifier comprises: a first rectifier input and a second rectifier input for receiving the alternating RF voltage, a first rectifier output and a second rectifier output for providing the DC electrical energy to the auxiliary circuit; a rectifying element connected between the first rectifier input and the second rectifier input wherein the (Continued)

first rectifier output is coupled to an output of the rectifying element and to the first rectifier input by a first inductor.

20 Claims, 5 Drawing Sheets

(51) Int. Cl.
    *H02J 50/20*         (2016.01)
    *H02J 50/00*         (2016.01)
    *H04B 5/00*          (2006.01)

(52) U.S. Cl.
    CPC ............ *H02J 50/001* (2020.01); *H02J 50/10* (2016.02); *H02J 50/20* (2016.02); *H04B 5/0031* (2013.01); *H04B 5/0037* (2013.01); *H04B 5/0075* (2013.01)

(58) Field of Classification Search
    CPC ... H02J 50/001; H04B 5/0031; H04B 5/0037; H04B 5/0075
    See application file for complete search history.

(56) References Cited

U.S. PATENT DOCUMENTS

| | | | |
|---|---|---|---|
| 11,295,187 B2 * | 4/2022 | Freitas | ................ H04B 5/0075 |
| 2006/1314258 | 6/2006 | Wang | |

FOREIGN PATENT DOCUMENTS

| | | |
|---|---|---|
| GB | 2456851 | 7/2009 |
| WO | 2014/061490 | 4/2014 |
| WO | 2016/055663 | 4/2016 |

\* cited by examiner

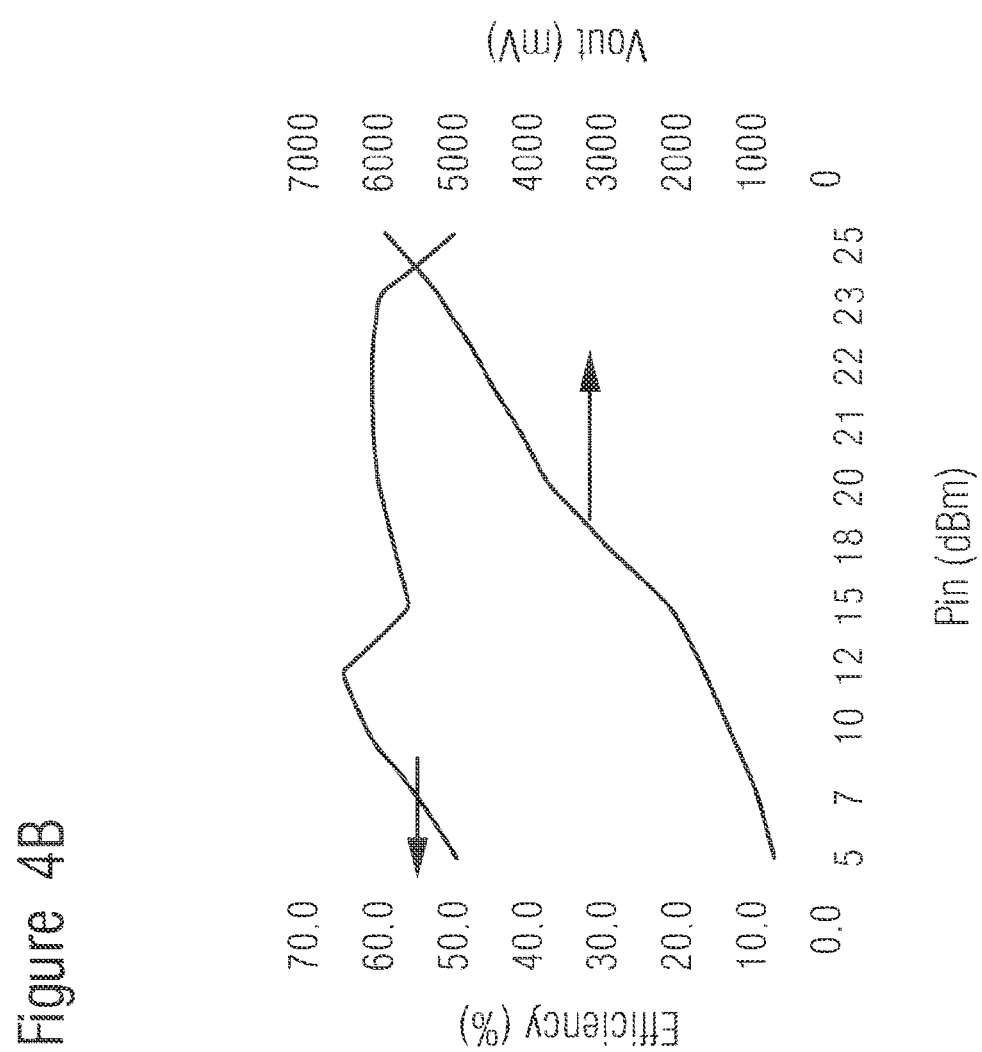

APPARATUS

This application is continuation of U.S. application Ser. No. 16/759,543, filed and nationalized on Apr. 27, 2020, which is a U.S. nationalization under 35 USC § 371 of PCT Application No. PCT/GB2018/053125, with an international filing date of Oct. 29, 2018, which claims priority from United Kingdom Patent Application No. GB 1717741.1, filed on Oct. 27, 2017, the entirety of which are each hereby fully incorporated by reference herein.

FIELD OF INVENTION

The present invention relates to the provision of electrical power in portable devices, and more particularly to the harvesting of power from electromagnetic fields, and still more particularly to a power harvester for integration with near field communications enabled devices such as RFID and NFC enabled devices.

BACKGROUND

Individuals need a secure and reliable way to prove their identity to protect their assets from fraud, and to prevent criminals from improperly obtaining credit or access to services in their names. Likewise, commercial organisation such as banks, mass-transit providers, and retailers, and public authorities such as social security providers, law enforcement, and immigration authorities, need reliable and secure methods to identify individuals.

Many methods of identifying individuals exist. The most basic form is the use of a physical object such as a key, a USB stick storing a secret token, or a bank card, credit card, or a fob. Such methods assume that the properly authorised individual keeps possession of the physical object. Criminals may attempt to steal such objects. So called "two factor authentication" systems were developed in an attempt to mitigate this risk. These provide a method of confirming a user's claimed identity by a combination of two different components—typically something they have (such as an ID card) and something they know (such as an access code). For example, credit cards have for some years used so called "chip and PIN" technology, to allow individuals to authenticate transactions. Other types of two-factor authentication exist. Two-factor authentication is a type of multi-factor authentication.

Humans may also have a variety of distinctive, measurable characteristics. These so called "biometric" characteristics can be used to identify individuals. Biometric identifiers may be based on physiological characteristics. Such characteristics may be related to the shape of the body. Examples include fingerprint, palm veins, facial characteristics, DNA, palm print, hand geometry, iris, retina and odour/scent.

Biometric ID systems may compare measured biometric data with a stored biometric template to determine whether an individual is the person they claim to be. To reduce the risk of such measured biometric data being intercepted and used to spoof (imitate) an individual, biometric data may be "tokenised". This involves substituting biometric data (e.g. measured biometric data and/or a biometric template) with a non-sensitive equivalent, called a token. The process combines the biometrics with public-key cryptography to enable the use of a stored biometric template (e.g., fingerprint image on a mobile or desktop device) for secure or strong authentication to applications or other systems without presenting the template in its original, replicable form.

Tokenising, or otherwise processing, biometric data requires relatively sophisticated data processing capability. The electrical power requirements of this data processing are high in comparison with the mere capture of that biometric data. Different approaches to the solution of this problem have been tried in the past.

For example, UK patent application GB2531378 describes an RFID system in which when an RFID reader sends a command to an RFID device, the device does not respond, but rather waits and harvests the power to drive some auxiliary functionality e.g. functionality not required for responding to the command, for example the command may be a "request to provide identification code" command. In this prior art system, a response to the command from the RFID device is intentionally delayed so as to allow the auxiliary function to be performed first. In this system, the auxiliary function is biometric authentication, and the RFID device does not respond to the command until the biometric authentication has been completed.

This may extend the interaction time of the RFID device (e.g. the period of time for which an RFID device must be held in proximity to a reader). The perceived delay in operation associated with this may be unacceptable to users.

SUMMARY

Aspects and embodiments of the present disclosure are set out in the appended claims. These and the other embodiments described herein aim to address technical problems related to those outlined above.

In particular, they aim to reduce the interaction time of near field communications devices which perform auxiliary functions, such as biometric authentication and/or tokenisation or other auxiliary functions.

Embodiments of the disclosure provide a rectifier for use in systems where high RF input power is available. Such systems may aim to provide a low output voltage (e.g. between 3V and 5V) without unduly compromising rectifier efficiency.

These and other embodiments aim to improve impedance matching between the rectifier and a power management module or other DC load arranged to receive direct current, DC, electrical energy from the rectifier.

Embodiments aim to address problems in prior power harvesting systems. For example, typically the impedance of an inductive coupler (such as an antenna) antenna is low compared to the input impedance of a rectifier. This provides a higher voltage level at the rectifier input, and may be desirable when available RF power is low. However, the inventors in the present case have appreciated that, in many circumstances in which auxiliary processing is required, the available RF power may be relatively high. They have also appreciated that rectifying networks with lower input impedance may be appropriate.

Embodiments of the disclosure provide a user identity verification apparatus comprising an inductive coupler for coupling inductively with a radio frequency, RF, H-field to provide an alternating RF voltage. This apparatus may also comprise a near field, RF, communicator connected to the inductive coupler for performing near field RF communication; and a biometric sensor for obtaining biometric data for identifying a user of the apparatus. Optionally, the apparatus also includes a data processor for processing the biometric data connected to the inductive coupler by a rectifier for obtaining DC electrical energy from the alternating RF voltage. The rectifier may comprise a rectifying element, such as a diode, having an output connected to a first output of the rectifier by a first inductor and to a first input of the rectifier by a first capacitor. Such a rectifier may be referred to herein as a "buck rectifier" because it reduces the output voltage of the rectified DC signal. It may also increase the output current, and reduce the output impedance of the rectifier as compared with conventional rectifiers.

In circumstances where significant RF power is available, such as when a power harvester is placed in direct contact with a near field communicator operating as a reader, the voltage across the rectifier output may be higher than typical DC loads can tolerate. Dealing with this mismatch between rectifier output and the load to be powered can reduce efficiency. As noted above, embodiments of the present disclosure address this problem by arranging a rectifying element, such as a diode, in a shunt configuration between the high and low voltage lines of a rectifier. This shunt rectifying element may replace the two series rectifying elements which may otherwise need to be used.

In a aspect there is provided an apparatus comprising: an inductive coupler for coupling inductively with a radio frequency, RF, H-field to provide an alternating RF voltage; a near field, RF, communicator connected to the inductive coupler for performing near field RF communication; and an auxiliary circuit connected to the inductive coupler by a rectifier for obtaining DC electrical energy from the alternating RF voltage. The auxiliary circuit may be arranged to communicate data with the near field RF communicator. The inductive coupler is optional, and the apparatus may merely have connections to allow it to be connected to such an inductive coupler thereby to obtain an alternating RF signal. In other words—the inductive coupler may be made and sold separately.

In this and other aspects of the disclosure the rectifier comprises: a first rectifier input and a second rectifier input for receiving the alternating RF voltage; a first rectifier output and a second rectifier output for providing the DC electrical energy to the auxiliary circuit; and a rectifying element connected between the first rectifier input and the second rectifier input, wherein the first rectifier output is coupled to an output of the rectifying element and to the first rectifier input by a first inductor.

The rectifier may comprise a first capacitor connected to the first rectifier output by the first inductor, and connected between the first rectifier input and the output of the rectifying element. The second rectifier output may be coupled to an input of the rectifying element and to the second rectifier input by a second inductor.

The rectifier may comprise a second capacitor connected to the second rectifier output by the second inductor, and connected between the second rectifier input and the input of the rectifying element.

The rectifier may be connected to the inductive coupler in parallel with a rectifier of the near field RF communicator.

The rectifier may be connected to the inductive coupler by a first matching network, while the rectifier is connected to the auxiliary circuit by a second matching network.

In an aspect there is provided a dual function apparatus comprising a near field communicator, an auxiliary power harvesting rectifier, and an auxiliary circuit arranged to be powered by the auxiliary rectifier. The auxiliary circuit may be configured to perform functions based on data provided to the auxiliary circuit by the near field communicator. For example, the auxiliary circuit may be configured to control a display such as an e-ink display.

The auxiliary circuit may be configured to provide data, such as commands or data based on user input, to the near field communicator. For example, the apparatus may comprise a biometric sensor such as a fingerprint scanner or retina scanner for obtaining biometric data input from a user. The auxiliary circuit may be configured to obtain such biometric data for identifying a user of the apparatus. It may also comprise a data processor for processing the biometric data, and it may be connected to the inductive coupler by a rectifier for obtaining DC electrical energy from an alternating RF voltage which also powers the near field RF communicator.

For example, both the rectifier and the near field communicator may both be connected to an inductive coupler for coupling inductively with a radio frequency, RF, H-field to provide an alternating RF voltage. The near field communicator can thus perform near field communication using the inductive coupler, whilst the rectifier harvests additional power from the same RF voltage to power the auxiliary circuits.

The rectifier may comprise a rectifying element having an output connected to a first output of the rectifier by a first inductor. The output of the rectifying element may also be connected to a first input of the rectifier by a first capacitor. An input of the rectifying element may be connected to a second output of the rectifier by a second inductor. The rectifier may comprise a second capacitor connected between the second input of the rectifier and the input of the rectifying element. This capacitor may thus be connected to the second output of the rectifier by the second inductor.

The rectifier may be connected to the inductive coupler by a first matching network. And, the rectifier may be connected to provide power to a load (such as an auxiliary circuit, e.g. as explained above) by a second matching network.

The rectifying element described and claimed herein provides a one way conduction path from the input of the rectifying element to its output. In any of the embodiments described herein, the rectifying element may comprise a diode, such as a Schottky diode. The rectifying element may be provided by appropriately arranged voltage controlled impedances, such as transistors. For example a diode connected transistor may be used—examples of diode connected transistors may be provided by:

connecting the base and collector of a BJT;
 connecting the drain and source of a JFET; or
 connecting the gate and drain of a MOSFET.

Other ways of providing a one way conduction path through a rectifying element may be used. It will also be appreciated that the rectifying element may itself comprise a plurality of such components.

Although such a rectifying element converts alternating RF voltage to DC electrical energy, harmonics of the alternating RF voltage may also be detectable at the output of the rectifier. In any of the embodiments described herein, a second matching network may be connected to the output of the rectifier to receive, from the rectifier both the DC electrical energy and one or more such harmonics. The reactive (inductive and/or capacitive) impedance of this matching network may be chosen to provide transitions in impedance which reflect the one or more harmonics back towards the rectifier (and so also to the rectifying element).

The present disclosure may provide a new rectifier topology for decreasing output DC voltage, without unduly compromising efficiency. Such a topology may be particularly suitable for high RF input power applications (>20 dBm). Embodiments may improve the impedance matching between the rectifier and a power management module or other auxiliary circuit. Thus the overall efficiency of such systems (rectifier+PMM) may be improved.

BRIEF DESCRIPTION OF DRAWINGS

Embodiments of the disclosure will now be described in more detail, by way of example only, with reference to the accompanying drawings, in which.

In the drawings, like reference numerals are used to indicate like elements

SPECIFIC DESCRIPTION

Figure 1:
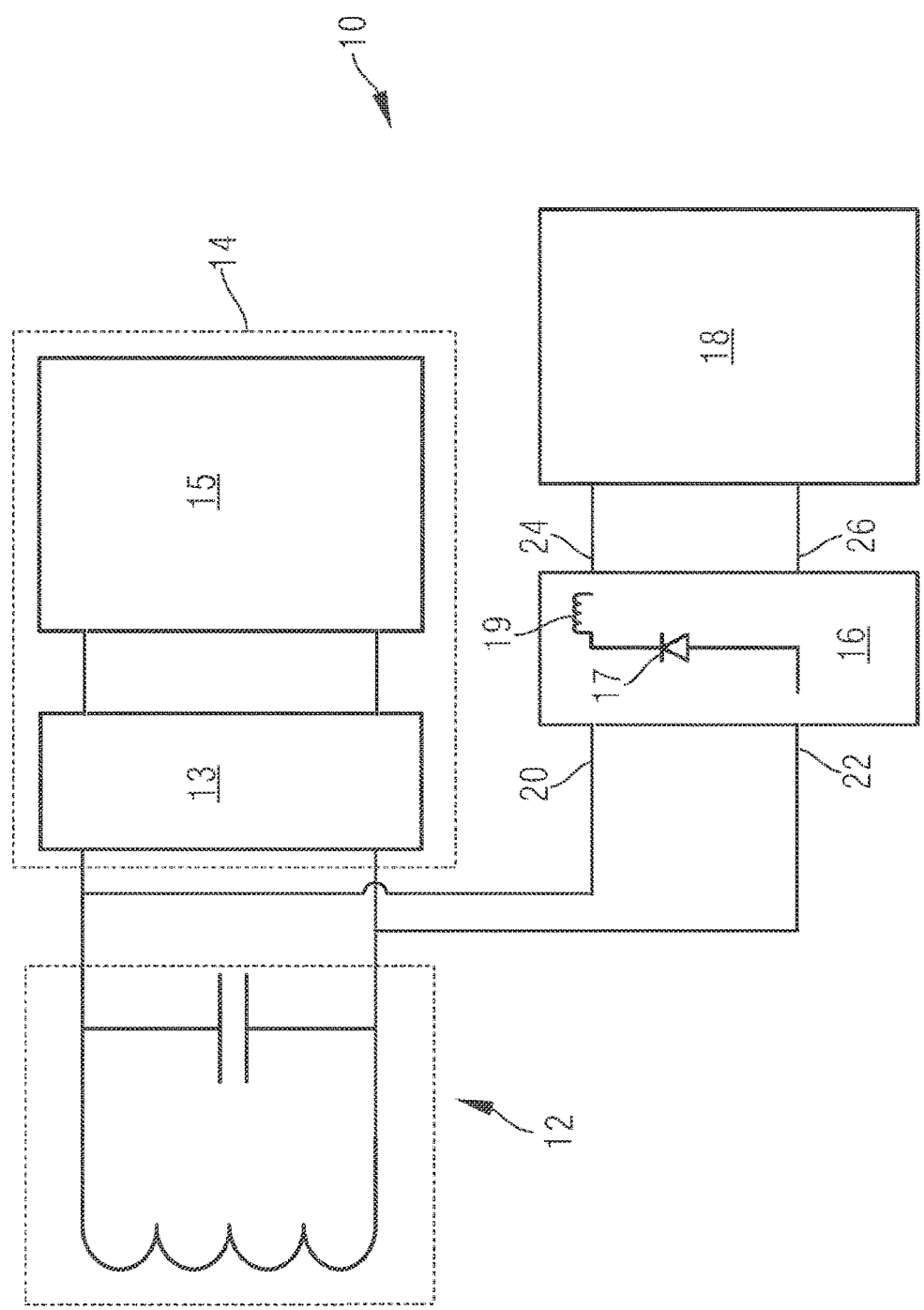
FIG. 1 shows a diagram of an apparatus comprising a near field communications enabled device with auxiliary functionality.

FIG. 1 shows a diagram of an apparatus 10 comprising an inductive coupler 12, a near field RF communicator 14, a rectifier 16, and an auxiliary circuit 18.

The inductive coupler 12 is connected to the rectifier 16 and to the near field RF communicator. The rectifier 16 is connected to the auxiliary circuit 18, and the auxiliary circuit 18 may be connected for communicating data to and/or from the near field RF communicator. This may enable the auxiliary circuits to process data received by the near field RF communicator via near field communication. It may also enable the auxiliary circuits to provide data to the near field RF communicator for communication to another device via near field communication.

The near field RF communicator 14 comprises a front end 13, which may include things such as a voltage regulator, a dedicated rectifier for the near field RF communicator, or other circuitry for connecting the near field RF communicator 14 to the inductive coupler 12. It also comprises a controller 15 for performing simple data operations such as modulating and demodulating data from signals received via the inductive coupler 12.

The inductive coupler 12 is arranged for coupling inductively with a radio frequency, RF, H-field—typically in a frequency band centred on 13.5 MHz, but other frequency bands may be used. The inductive coupler 12 may comprise an arrangement of conductors, such as a loop antenna or a coil antenna having a degree of inductive and/or capacitive impedance.

The auxiliary circuit 18 is connected to the inductive coupler 12 by a rectifier 16. The auxiliary circuit 18 may comprise any one or more of the following:

A biometric sensor such as a fingerprint, scanner;
A camera;
A display such as an e-ink display;
A location determiner such as a GPS receiver; and
Digital signal processing circuitry for processing biometric data to tokenise that biometric data and/or to compare it with a biometric template associated with the user.

The rectifier comprises a first rectifier input 20, and a second rectifier input 22. It also comprises a first rectifier output 24, and a second rectifier output 26. The first rectifier input 20 can be connected to a first output of the inductive coupler.

In the differential configuration illustrated in FIG. 1, the rectifier 16 also comprises a second rectifier input 22, which can be connected to a second output of the inductive coupler. The rectifier 16 can thus be arranged to obtain, across the first rectifier input 20 and the second rectifier input 22, an alternating RF voltage from the inductive coupler. It is configured to convert that RF voltage into DC electrical energy. That DC electrical energy may be provided as a voltage across the first rectifier output 24 and the second rectifier output 26. These outputs 24, 26 can be connected to the auxiliary circuit 18 for providing DC electrical energy to the auxiliary circuit 18.

The rectifier 16 comprises a rectifying element 17 configured to provide a one way conduction path for current (e.g. from its input to its output) and it may be provided by a diode. The one way conduction path provided by the rectifying element 17 couples both the first rectifier input 20 and the first rectifier output 24 to both the second rectifier input 22 and to the second rectifier output 26. In other words, the rectifying element 17 is connected in shunt, thereby to provide a one-directional current flow path between the inputs of the rectifier 16. A first inductor 19 may connect the output of the rectifying element 17 to the second rectifier output 26. The rectifier 16 illustrated in FIG. 1 is thus arranged to provide a DC voltage between the first rectifier output 24 and the second rectifier output 26.

A key function that this type of rectifier may provide is that the shunt rectifying element (e.g. shunt diode) provides a reduction of the output impedance, therefore reducing the output voltage whilst the series inductor may help to keep the current high. Without the series inductor, the current may decrease undesirably when the diode is off. Keeping the current high, for a constant output power level, may contribute to providing a lower output voltage. This may enhance matching with a low voltage DC load. It will be appreciated in the context of the present disclosure that this functionality may be provided in a number of different ways.

Figure 2:
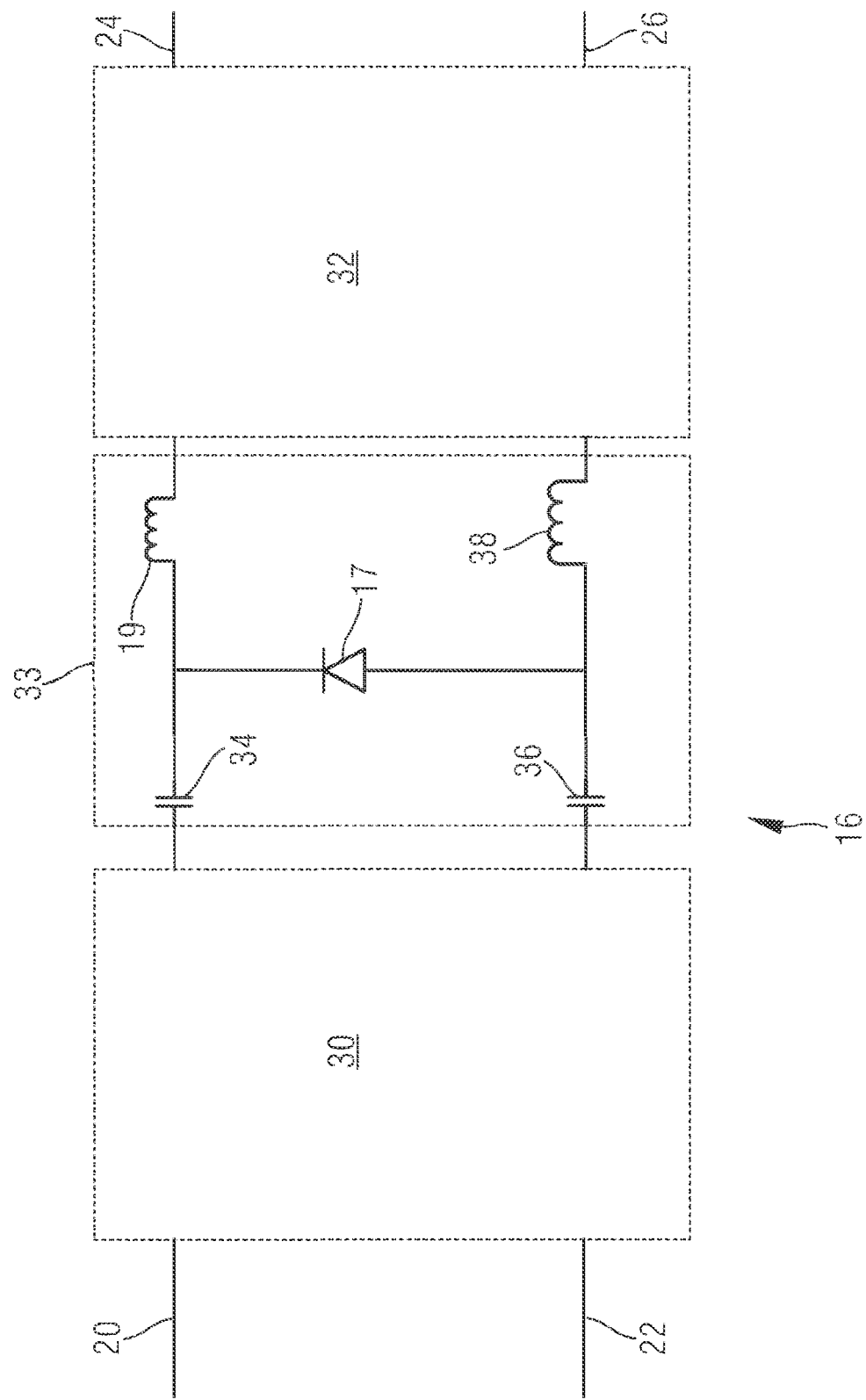
FIG. 2 shows a schematic diagram of a rectifier for powering auxiliary functionality of a near field communications enabled device.

FIG. 2 shows one example of such a rectifier. This rectifier may be suitable for use in the apparatus shown in FIG. 1.

The rectifier 16 illustrated in FIG. 2 comprises a first matching network 30, a rectifying network 33, and a second matching network 32. It also comprises a first rectifier input 20 and a second rectifier input 22, a first rectifier output 24 and a second rectifier output 26.

The first matching network 30 is configured to provide a higher output impedance than the inductive coupler, and a lower input impedance than the rectifying network 33. The second matching network 32 may be configured to provide an RF trap to reflect harmonics of the alternating RF signal which may pass through the rectifying network 33 back across the rectifying network 33.

The first rectifier input 20 and the second rectifier input 22 are connected to the rectifying network 33 by the first matching network. The rectifying network 33 is connected to the first rectifier output 24 and the second rectifier output 26 by the second matching network 32.

Figure 3:
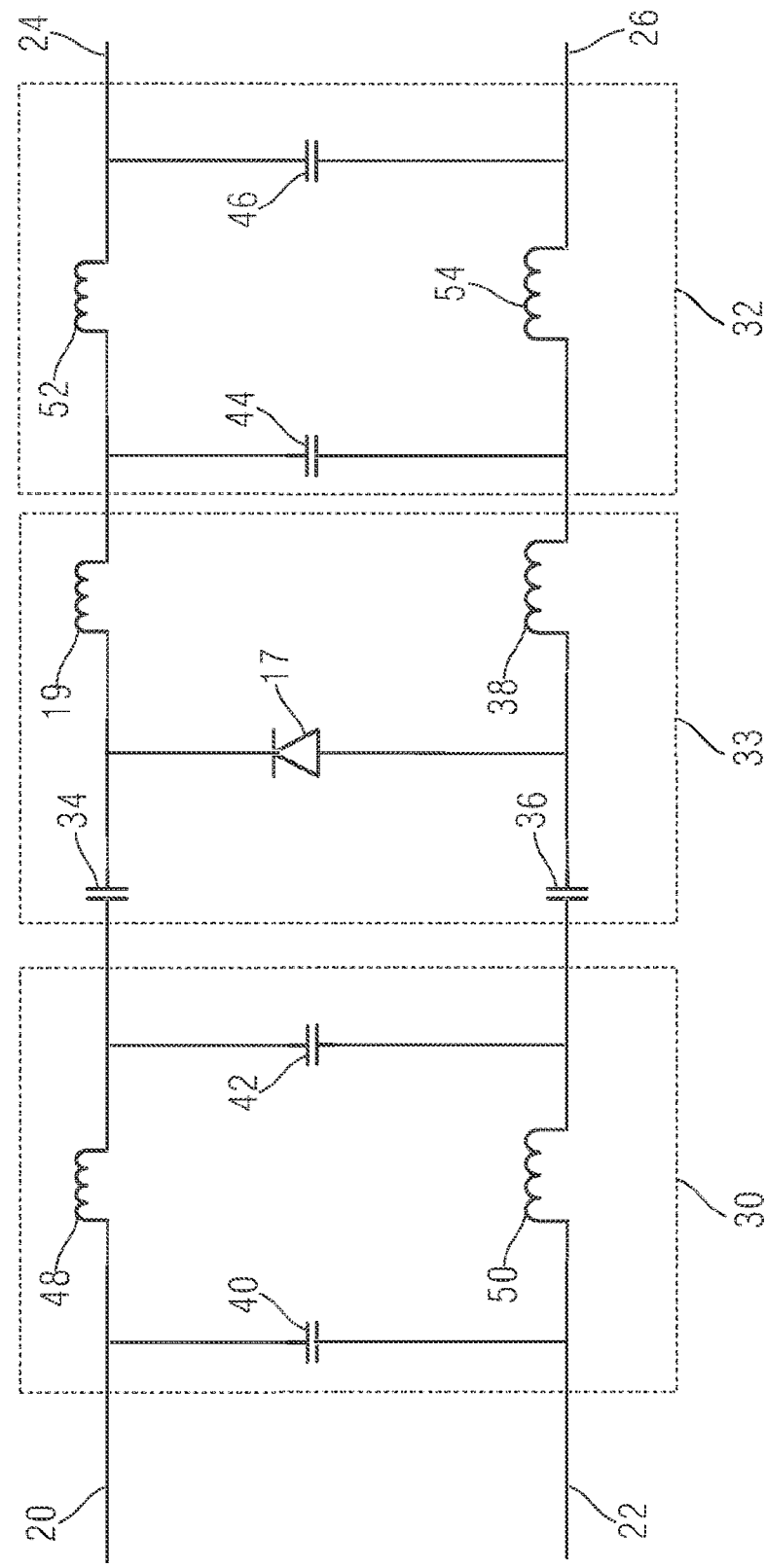
FIG. 3 shows a schematic diagram of another rectifier such as that shown in FIG. 2 in which optional details of matching networks have been proposed.

The first matching network 30 comprises an arrangement of capacitive and inductive impedances configured to present an input impedance to an inductive coupler (such as the inductive coupler 12 of the apparatus illustrated in FIG. 1) which matches the output impedance of that inductive coupler. The arrangement of capacitive and inductive impedances is also configured to present an output impedance to the rectifying network 33 which matches the input impedance of the rectifying network 33. The second matching network 32 may be similarly constructed, and arranged to provide the same matching function—providing an input impedance which matches the output impedance of the rectifier 16, and providing an output impedance which matches that of the load to be powered. A variety of such configurations may be used in both of these networks. In an embodiment at lower frequencies, such as 13 MHz, a differential or single end design is quite similar. The matching network in FIG. 3 is quite general, and may be applied for higher frequencies. Typically passive electronic components such as inductors and capacitors may be connected together to provide a network which provides this function. A variety of configurations may be selected. One such configuration is illustrated in FIG. 3, and described below.

The rectifying network 33 comprises a first capacitor 34, a second capacitor 36, a first inductor 19, a second inductor 38, and a rectifying element 17. The rectifying element 17 is configured to provide a one way conduction path for electrical current to flow from the input of the rectifying element 17 to the output of the rectifying element 17. The rectifying element 17 may comprise a diode.

A first plate of the first capacitor 34 is connected to a first output of the first matching network 30. A second plate of the first capacitor 34 is connected to the output of the rectifying element 17, and to the first inductor 19. The first inductor 19 connects the second plate of the first capacitor 34 and the output of the rectifying element 17 to a first input of the second matching network 32.

A first plate of the second capacitor 36 is connected to a second output of the first matching network 30. A second plate of the second capacitor 36 is connected to the input of the rectifying element 17, and to the second inductor 38. The second inductor 38 connects the second plate of the capacitor and the input of the rectifying element 17 to a second input of the second matching network 32.

The rectifying element 17 can provide, based on the alternating input voltage, a DC voltage difference between the input of the rectifying element 17 and the output of the rectifying element 17. This DC voltage can charge the first capacitor 34 so that electrical energy is stored on the first capacitor 34. The first inductor 19 helps to keep the current high in both halves of each RF cycle. It will be appreciated in the context of the present disclosure that the second capacitor 36 and the second inductor 38 provide corresponding functions.

In addition, the inductor 38 is optional, and may be removed. This is particularly the case in single ended embodiments. In these embodiments, an output storage capacitor may be connected to the input of the rectifying element 17, and to the output of the rectifying element 17 by the first inductor 19. In this position, such a capacitor may perform the function of storing DC output energy (hence its name).

The second capacitor 36 shown in FIG. 3 is also optional, and may be removed. Again, this is of particular relevance in single ended embodiments. In these embodiments, a filter capacitor may be connected between the input of the rectifying element 17, and the output of the rectifying element 17. In particular, a first plate of this filter capacitor may be connected to the input of the rectifying network 33, and to the input of the rectifying element 17 whilst a second plate of this filter capacitor is connected to the output of the rectifying element 17. It will of course be appreciated that in these and other embodiments the rectifying element 17 may be provided by a plurality of rectifying elements arranged in parallel with each other.

FIG. 3 is a diagram of a rectifier, such as that illustrated in FIG. 2, having a particular arrangement of the first matching network 30, and the second matching network 32. In FIG. 2 and FIG. 3, like reference numerals are used to indicate like elements.

The first matching network 30 may comprise a first matching capacitor 40, a first matching inductor 48, a second matching capacitor 42 and a second matching inductor 50. In the arrangement illustrated in FIG. 3, the first rectifier input 20 is connected to a first plate of the first matching capacitor 40 and to the first matching inductor 48. The first matching inductor 48 connects the first rectifier input 20 to the first plate of the first capacitor 34 of the rectifying network 33, and to a first plate of the second matching capacitor 42. The second rectifier input 22 is connected to a second plate of the first matching capacitor 40 and to the second matching inductor 50. The second matching inductor 50 connects the second rectifier input 22 to the first plate of the second capacitor 36 of the rectifying network 33, and to a second plate of the second matching capacitor 42.

The second matching network 32 may comprise a third matching capacitor 44, a third matching inductor 52, a fourth matching capacitor and a fourth matching inductor. A first plate of the third matching capacitor 44 is connected by the first inductor 19 to the output of the rectifying element 17. The first plate of the third matching capacitor 44 is also connected by the third matching inductor to the first rectifier output 24. The first rectifier output 24 is connected to a first plate of the fourth matching capacitor 46 and to the third matching inductor 52. The third matching inductor 52 connects the first inductor 19 of the rectifying network 33 to the first plate of the fourth matching capacitor 46. The second rectifier output 26 is connected to the second plate of the fourth matching capacitor 46 and to the fourth matching inductor 54. The fourth matching inductor 54 connects the second rectifier output 26 to the second plate of the third matching capacitor 44 and to the second inductor 38 of the rectifying network 33.

In operation, based on an alternating RF voltage received via the first matching network 30 the rectifying element 17 provides, at its output, DC electrical energy and one or more harmonics of the alternating RF voltage. The second matching network 32 receives the DC electrical energy and provides i- to the rectifier outputs. The second matching network 32 also receives the one or more harmonics and reflects those harmonics back towards the rectifying element 17.

Whilst the primary function of the first matching network 30 is to present a lower input impedance to an inductive coupler (such as the inductive coupler 12 of the apparatus shown in FIG. 1) than would be provided by the rectifying network 33 taken alone, it may also serve to reflect, back towards the rectifying network 33, harmonics of the alternating RF voltage that have been reflected from the second matching network 32. The component values in the matching network may be chosen to increase the reflection of harmonics whilst also matching the impedance of the rectifier at the fundamental frequency.

Investigation by the inventors has shown that the efficiency and frequency characteristics provided by the embodiments described herein are particularly desirable.

Figure 4A:
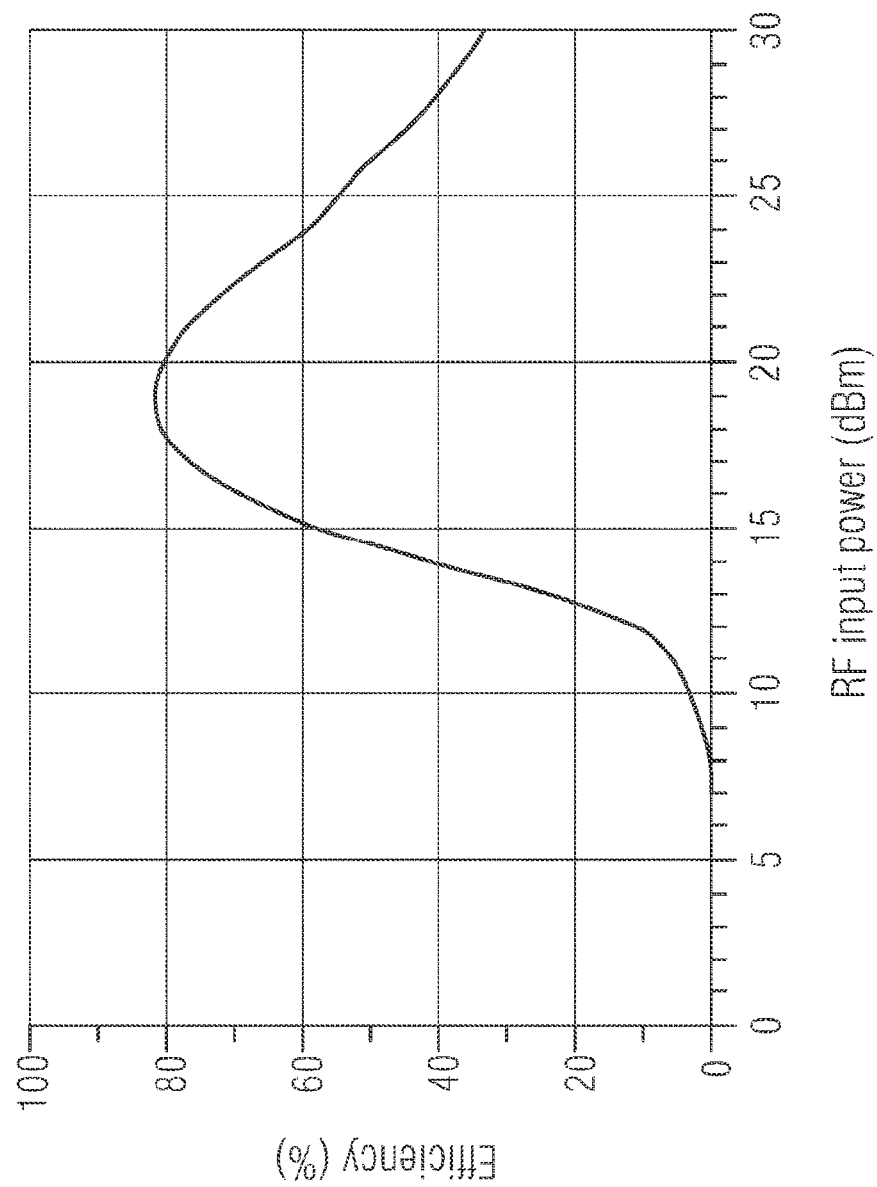
FIG. 4A shows a plots of simulated efficiency data for a rectifier and matching networks as illustrated in FIG. 3; and, FIG. 4B shows a measured efficiency data for a rectifier and matching networks as illustrated in FIG. 3.

FIG. 4A shows a plot of simulated efficiency data for a rectifier and matching networks as illustrated in FIG. 3. The simulation which produced this data was conducted assuming the output voltage provided from the rectifier outputs was 3.5V. It can be seen that, for a range of input powers between about 17 and about 21 dBm, the efficiency is better than 80%. This is comparable to the efficiency achieved by a prior art rectifier providing a 13V DC output voltage. This embodiment may thus achieve the goal of providing lower output voltage at high power without undesirable loss of efficiency. This topology may therefore significantly reduce the mismatch when connecting to a classical PMM, improving the overall system efficiency.

FIG. 4B shows a measured efficiency data for a rectifier and matching networks as illustrated in FIG. 3.

In the arrangement illustrated in FIG. 1, power provided by the alternating voltage at the output of the inductive coupler may be shared between the near field communicator and the rectifier for the auxiliary circuit 18 by appropriate selection of the input impedance of the rectifier and the input impedance of the near field communicator. In other words—power may be shared passively between the two parts of the apparatus. It will be appreciated however that power may be shared actively between the two. That is to say a switch may be provided in the connection between the inductive coupler and the near field communicator, and another switch may be provided in the connection between the inductive coupler and the rectifier for the auxiliary circuit 18. A controller may share the power provided by the alternating voltage by controlling these switches.

The near field RF communicators referred to herein may be any type of near field RF communications enabled device. It will be appreciated in the context of the present disclosure that near field RF communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RF communicator" includes not only NFC communicators but also initiating near field RF communicators such as RFID transceivers or readers that are capable of initiating a near field RF communication but not responding to initiation of a near field RF communication by another near field RF communicator and responding near field RF communicators such as RFID transponders or tags that are capable of responding to initiation of a near field RF communication by another near field RF communicator but not of initiating a near field RF communication with another near field RF communicator.

An RFID tag is always a target and an RFID reader always an initiator of communication. However, as will be understood from the above, an NFC communicator may operate in an "initiator" mode in which the NFC communicator seeks to initiate near field RF communication or in a "target" mode in which the NFC communicator is receptive to initiation of near field RF communication. NFC communicators may also operate in either a "passive communications mode" or an "active communications mode". When communication is by the "passive communications mode" an initiator NFC communicator will generate an RF field and a target NFC communicator will respond by modulation of the received RF signal, usually by load modulation. When communication is by the "active communications mode" both the initiator NFC communicator and the target NFC communicator use their own RF field to enable communication.

An RFID tag may be an active tag, that is a tag which is self-powered, or a passive tag, that is a tag which derives power by inductive coupling to the magnetic field (H-field) generated by an RFID reader or NFC communicator. The terms "passive" and "active" in the context of NFC communicators thus do not have the same meaning as "passive" and "active" when used in the context of traditional RFID tags and readers.

Embodiments of the present disclosure may comprise smart cards, e.g. a plastic card, often having the same form factor as a typical credit card but carrying a built-in microprocessor. This microprocessor may comprise the auxiliary circuits described herein.

In an embodiment there is provided a power harvesting apparatus comprising a signal connection for connecting to a source of alternating voltage, such as an RF antenna or a capacitive coupler for coupling with an alternating E-field, or an inductive coupler for coupling with an alternating H-field. Such a power harvesting apparatus also comprises a rectifier, coupled to the signal connection for receiving the alternating voltage.

The rectifier comprises a rectifying element having an output connected to a first output of the rectifier by a first inductor. The output of the rectifying element is also connected to a first input of the rectifier, optionally by a first capacitor.

The rectifier may be single ended or differential. In single ended embodiments the input of the rectifying element may be coupled to a ground or reference voltage. For example, the second input of the rectifier may be connected to a ground or reference voltage. In single ended embodiments, the output of the rectifying element may be connected zo the second input of the rectifier by a filter capacitor. In single ended embodiments, optionally, an output storage capacitor may be connected between the first output of the rectifier and a second output of the rectifier.

In differential embodiments, a second input of the rectifier may be connected to the input of the rectifying element, optionally by a second capacitor. In both differential and single ended embodiments, the input of the rectifying element may be connected to a second output of the rectifier, optionally by a second inductor.

The rectifier may be connected to the signal connection by a first matching network. The rectifier may be connected to power an auxiliary circuit (such as a biometric sensor) by a second matching network.

The rectifying element may generate, based on the alternating RF voltage, DC electrical energy and one or more harmonics of the alternating RF voltage, and the second matching network is arranged to receive, from the rectifying element, the DC electrical energy and the one or more harmonics and to reflect the one or more harmonics back towards the rectifying element.

The data processing and other functionality described and claimed herein may be provided by a general purpose processor, which may be configured to perform a method according to any one of those described herein.

Whilst the embodiments described herein have particular utility when the rectifier is connected for harvesting power from an inductive coupler of a near field RF communications device, embodiments of the disclosure may be used in other applications. For example, instead of being connected to the inductive coupler of a near field RF communications device they may be connected to the antenna of a WiFi enabled device, a Bluetooth device, a telecommunications device such as a cellular telephone, or any other device which receives significant RF power.

In some examples the controllers, processors, and other types of logic described and/or claimed herein may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. Analogue control circuits may also provide at least a part of this control functionality. An embodiment provides an analogue control circuit configured to perform any one or more of the signal processing methods and/or logic described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A power harvesting apparatus comprising:
    an inductive coupler for coupling inductively with a radio frequency, RF, H-field to provide an alternating RF voltage;
    a near field, RF, communicator connected to the inductive coupler for performing near field RF communication;
    an auxiliary circuit arranged to communicate data with the near field RF communicator;
    wherein the auxiliary circuit is connected to the inductive coupler by a buck rectifier for obtaining DC electrical energy from the alternating RF voltage.

2. The apparatus of claim 1 wherein the buck rectifier comprises a rectifying element having an output connected to a first output of the buck rectifier by a first inductor, and to a first input of the buck rectifier by a first capacitor.

3. The apparatus of claim 2 wherein a second input of the buck rectifier is connected to a ground or reference voltage.

4. The apparatus of claim 2 wherein the output of the rectifying element is connected to the second input of the buck rectifier by a filter capacitor.

5. The apparatus of claim 2 wherein an output storage capacitor is connected between the first output of the buck rectifier and a second output of the buck rectifier.

6. The apparatus of claim 2 wherein an input of the rectifying element is connected to a second output of the buck rectifier by a second inductor.

7. The apparatus of claim 1 wherein the buck rectifier is single ended.

8. The apparatus of claim 1 wherein the auxiliary circuit comprises at least one of:
    a biometric sensor;
    a camera;
    a display;
    a location determiner; and
    data processing circuitry for processing biometric data.

9. The apparatus of claim 8 wherein the data processing circuitry is configured to tokenise said biometric data.

10. The apparatus of claim 8 wherein the data processing circuitry is configured to compare said biometric data with a biometric template for authentication.

11. The apparatus of claim 1 wherein the buck rectifier comprises:
    a first rectifier input and a second rectifier input for receiving the alternating RF voltage,
    a first rectifier output and a second rectifier output for providing the DC electrical energy to the auxiliary circuit;
    a rectifying element connected between the first rectifier input and the second rectifier input
    wherein the first rectifier output is coupled to an output of the rectifying element and to the first rectifier input by a first inductor.

12. The apparatus of claim 11 wherein the buck rectifier comprises a first capacitor connected to the first rectifier output by the first inductor, and connected between the first rectifier input and the output of the rectifying element.

13. The apparatus of claim 1 wherein the buck rectifier is connected to the inductive coupler in parallel with a rectifier of the near field RF communicator.

14. The apparatus of claim 1 wherein the rectifying element comprises a diode.

15. A smart card comprising the apparatus of claim 1.

16. A power harvesting method comprising:
    coupling inductively with a radio frequency, RF, H-field using an inductive coupler to provide an alternating RF voltage;
    performing near field RF communication using a near field, RF, communicator connected to the inductive coupler;
    obtaining DC electrical energy from the alternating RF voltage using a buck rectifier to power an auxiliary circuit connected to the inductive coupler by a rectifier; and
    communicating data between the auxiliary circuit and the near field RF communicator.

17. The method of claim 16 wherein the buck rectifier decreases output voltage and increases output current to improve efficiency of power harvesting.

18. The method of claim 16 wherein the auxiliary circuit comprises data processing circuitry for processing biometric data, and the method comprises using the data processing circuitry to process said biometric data.

19. The method of claim 16 wherein the auxiliary circuit comprises data processing circuitry for processing biometric data, and the method comprises using the data processing circuitry to compare said biometric data with a biometric template for authentication.

20. The method of claim 16 comprising using data communicated between the auxiliary circuit and the near field RF communicator to authenticate a user.

* * * * *